(12) United States Patent
Naruse et al.

(10) Patent No.: US 8,795,863 B2
(45) Date of Patent: Aug. 5, 2014

(54) ABNORMALITY DETECTOR AND DETECTION METHOD, AND FACILITY FOR PRODUCING BATTERY

(75) Inventors: Yoichi Naruse, Nagoya (JP); Hiroyasu Kado, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 124 days.

(21) Appl. No.: 13/125,991

(22) PCT Filed: Jan. 8, 2009

(86) PCT No.: PCT/JP2009/050120
§ 371 (c)(1),
(2), (4) Date: Apr. 26, 2011

(87) PCT Pub. No.: WO2010/079597
PCT Pub. Date: Jul. 15, 2010

(65) Prior Publication Data
US 2011/0212349 A1  Sep. 1, 2011

(51) Int. Cl.
*H01M 10/48* (2006.01)
*H01M 2/10* (2006.01)
*H01M 10/0525* (2010.01)

(52) U.S. Cl.
CPC .......... *H01M 10/486* (2013.01); *H01M 10/482* (2013.01); *Y02E 60/12* (2013.01); *H01M 10/0525* (2013.01); *H01M 2/1016* (2013.01)
USPC ............... 429/90; 429/50; 429/163; 429/247; 374/60; 206/703

(58) Field of Classification Search
USPC ............................................. 206/703–705
See application file for complete search history.

(56) References Cited

U.S. PATENT DOCUMENTS

2002/0155348 A1* 10/2002 Gitto .............................. 429/163
2008/0220320 A1* 9/2008 Horikoshi et al. ............... 429/82

FOREIGN PATENT DOCUMENTS

JP  10-247527  9/1998
JP  11-219732  8/1999

(Continued)

OTHER PUBLICATIONS

English machine translation of Tetsuo JP2008-113505 (May 2008).*

(Continued)

*Primary Examiner* — Ula C Ruddock
*Assistant Examiner* — Lisa S Park Gehrke
(74) *Attorney, Agent, or Firm* — Finnegan, Henderson, Farabow, Garrett & Dunner, LLP

(57) ABSTRACT

Provided is a technology for detecting abnormal temperature rise of a battery regardless of the number of batteries, and preventing a trouble caused by abnormal temperature rise. A battery production facility (30) for producing a secondary battery (1) comprises an abnormality detector (40) for detecting abnormal state (especially, abnormal temperature rise) of a plurality of secondary batteries (1, 1, . . . ), and a detector (45) for generating a control signal in order to take a predetermined step according to the detection result from the abnormality detector (40). The abnormality detector (40) comprises a low temperature reactant (41) provided in contact with a part of the secondary battery (1) which becomes high temperature easily and reacts at a temperature lower than the temperature at which the secondary battery (1) becomes abnormal state, and a detection sensor (42) for detecting change of the low temperature reactant (41), and detects abnormal state of the secondary battery (1) according to the detection result from the detection sensor (42).

1 Claim, 12 Drawing Sheets

(56) References Cited

FOREIGN PATENT DOCUMENTS

| JP | 2001-332237 | | | 11/2001 |
|---|---|---|---|---|
| JP | 2003-151525 | A | * | 5/2003 |
| JP | 2007-265658 | | | 10/2007 |
| JP | 2008-113505 | | | 5/2008 |
| JP | 2008-113505 | A | * | 5/2008 |
| JP | 2008-251263 | | | 10/2008 |

OTHER PUBLICATIONS

International Search Report in International Application No. PCT/JP2009/050120; Mailing Date: Apr. 21, 2009.

* cited by examiner

ABNORMALITY DETECTOR AND DETECTION METHOD, AND FACILITY FOR PRODUCING BATTERY

CROSS-REFERENCE TO RELATED APPLICATIONS

This application is a national phase application of International Application No. PCT/JP2009/050120, filed Jan. 8, 2009, the contents of which are incorporated herein by reference.

TECHNICAL FIELD

The present invention relates to a device and method for detecting an abnormality and to a facility for manufacturing a battery, more particularly to a technique of detecting an abnormal temperature rising in a process of manufacturing secondary batteries.

BACKGROUND ART

In the conventional manufacturing line for battery, the batteries are assembled, followed by processes such as charging/discharging, storage, performance test, and shipment as products.

For example, in the charging process, the program controls the charge condition to the proper extent. In the process, the fault of the charging program results in overcharge of the battery, and the chain reaction in the battery rapidly occurs, thereby causing the abnormal rise in temperature of the battery. In the other processes, the short circuit caused by the defective battery or the heat added from outside may cause abnormal rise in temperature of the battery.

The abnormal temperature rising may occur thermorunaway of the battery, so that various techniques are provided to detect the abnormality of the battery in the conventional line.

Patent Literature 1 discloses a charge/discharge apparatus for charging and discharging batteries, in which every battery housed in a casing is arranged with a temperature sensor, and the apparatus includes a facility that stops the charging in accordance with the detected temperature by means of the temperature sensor and an alarm device alerting in accordance with the detected temperature. The apparatus is allowed to detect the abnormal temperature rising by means of the temperature sensors and to prevent the thermorunaway caused by the abnormal temperature rising.

Unfortunately, as to the abnormality detection facility disclosed in the Patent Literature 1, every battery in the casing has to be attached with the temperature sensor, or each battery has to be arranged in the predetermined position on which the temperature sensor is mounted. Thus, the facility of the Patent Literature 1 includes disadvantages that the attaching operation of the temperature sensors to the batteries or the arranging operation of the batteries is troublesome.

When the facility of the Patent Literature 1 is applied to a large-scale facility for manufacturing a large number of batteries, it is not practical to prepare the temperature sensors by the same number as the batteries and to monitor the temperatures of each battery, considering the attaching operation, the monitoring operation, and the cost of equipment.

Furthermore, the detectable area of the sensor is limited to the portion where the detecting unit contacts, and a large number of sensors are needed to provide a wide area monitoring for the batteries, such as to widely detect the temperature of the battery surfaces, whereby the structure is not practical.

[Patent Literature 1] JP H11-219732 A

DISCLOSURE OF INVENTION

Problems to be Solved by the Invention

The objective of the present invention is to provide an unexpected device and method for detecting the abnormality of the batteries capable of detecting the abnormal temperature rising of the batteries regardless of the number of batteries, and to provide an unexpected facility for manufacturing batteries capable of detecting the abnormal temperature rising of the batteries regardless of the number of batteries and capable of preventing the defects caused by the abnormal temperature rising.

Means of Solving the Problems

The first aspect of the present invention is a device for detecting an abnormality of multiple batteries which includes a low temperature reaction material reacting at lower temperature than the temperature that the abnormality of the battery occurs, arranged to contact an area of the battery likely to become high temperature; and a sensor for detecting the change of the material.

In the preferable embodiment of the present invention, the multiple batteries are stored in a storing member made of fire retarding material, and in the storing member, partition member made of fire retarding material are inserted between the batteries, and the low temperature reaction material is arranged in the partition member.

The second aspect of the present invention is a method for detecting an abnormality of multiple batteries which includes steps of preparing a low temperature reaction material reacting at lower temperature than the temperature that the abnormality of the battery occurs, contacting the low temperature reaction material to an area of the battery likely to become high temperature, and detecting the change of the material for detecting the abnormality of the batteries.

In the preferable embodiment of the present invention, the low temperature reaction material is arranged in a partition member having the batteries on either side.

The third aspect of the present invention is a facility for manufacturing multiple batteries which includes a device for detecting an abnormality of the batteries having a low temperature reaction material reacting at lower temperature than the temperature that the abnormality of the battery occurs, arranged to contact an area of the battery likely to become high temperature and a sensor for detecting the change of the material, and in the facility, the manufacturing processes are stopped or an alarm is alerted in accordance with the abnormality of the batteries detected by the abnormality detection device.

Effect of the Invention

According to the present invention, regardless of the number of the batteries, the device and method for detecting the abnormality of the batteries capable of detecting the abnormality (particularly abnormal temperature rising) of the batteries and the facility for manufacturing the batteries capable of detecting the abnormality (particularly abnormal temperature rising) of the batteries and of preventing the defects caused by the abnormality are provided.

THE BEST MODE FOR CARRYING OUT THE INVENTION

Figure 1:
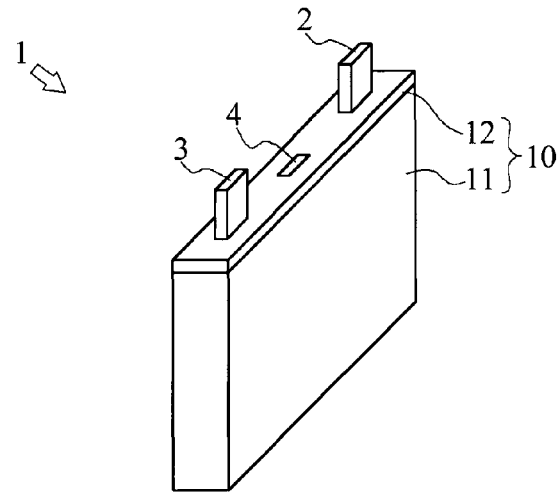
FIG. 1 is a perspective view of a secondary battery as an embodiment of a battery according to the present invention.
Figure 2:
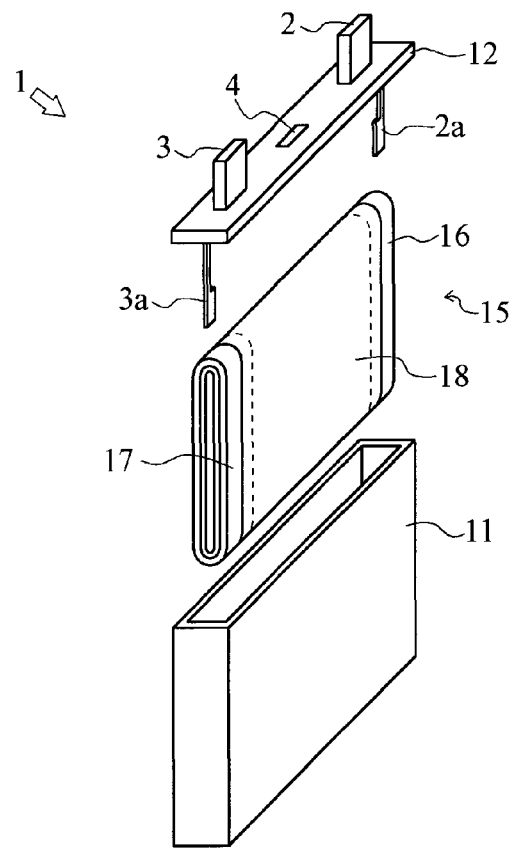
FIG. 2 is an exploded perspective view showing an internal structure of the battery.

Referring to FIGS. 1, 2, a secondary battery 1 is described, as a first embodiment of a battery in accordance with the present invention. The battery 1 is a rechargeable battery such as lithium-ion secondary battery, lithium secondary battery, nickel-metal hydride battery, and nickel-cadmium battery.

As depicted in FIG. 1, the battery 1 is configured as a prismatic lithium-ion secondary battery having a rectangular parallelepiped shape. As shown in FIGS. 1, 2, the battery 1 includes a casing 10, a positive terminal 2 and negative terminal 3 projecting from the casing 10, and an electrode body 15.

The battery 1 may be a laminate battery in which the electrode body 15 is covered with the laminate film.

As shown in FIGS. 1, 2, the casing 10 contains the electrode body 15 and is made of metal or resin, which has a main body 11 formed with an open face and a lid 12 for covering the open face of the main body 11. The casing 10 is filled with non-aqueous electrolyte.

The main body 11 is configured as a box having an open face. The open face of the main body 11 is covered and fixed with the lid 12 by means of welding. The lid 12 is configured as a plate having a corresponding shape with the open face of the main body 11, and is provided with a safety valve 4 at the center and with the terminals 2, 3 at the end.

The safety valve 4 works when the inner pressure of the casing 10 becomes above the predetermined value to exhaust the gas from the casing 10.

The positive terminal 2 is projected outward from the casing 10 and connected to a positive plate 16 of the electrode body 15 through a positive lead 2a. The negative terminal 3 is projected outward from the casing 10 and connected to a negative plate 17 of the electrode body 15 through a negative lead 3a. The battery 1 is connected to the exteriors through the positive and negative terminals 2, 3.

As shown in FIG. 2, the electrode body 15 is configured as a roll electrode body, in which the positive plate 16 and the negative plate 17 are layered via a separator 18 and they are wound flatly.

The positive plate 16 is an electric collector made of aluminum, on which positive active material is coated, and is formed by roll-pressing or the like, and the negative plate 17 is an electric collector made of copper, on which negative active material is coated, and is formed by roll-pressing or the like.

On one end of the electrode body 15, the positive plate 16 is projected to be connected with the positive lead 2a, and on the other end of the electrode body 15, the negative plate 17 is projected to be connected with the negative lead 3a. The electrode body 15 can be electrically connected with the terminals of external equipments (not shown) through the positive lead 2a, the positive terminal 2 and the negative lead 3a, negative terminal 3, and the electrode body exchanges the energy with the external equipment.

The batteries 1 as configured above are assembled through proper assembly process, and transferred in the following processes being stored in storing pallets 20.

Figure 3:
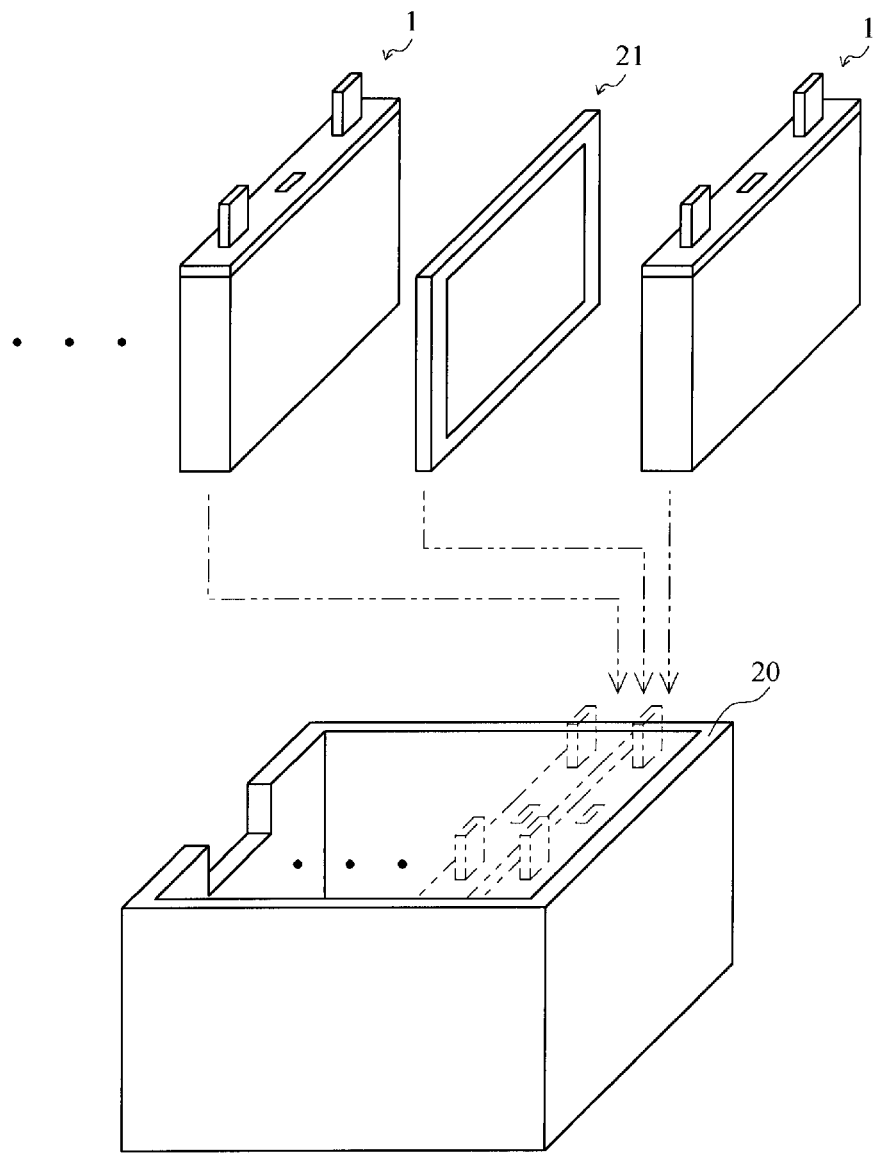
FIG. 3 is a perspective view illustrating a storing pallet and partition plates.

As shown in FIG. 3, the pallet 20 has four sides and a bottom and has a box structure. The pallet 20 has a structure corresponding to the batteries 1, and stores multiple (e.g. 5 to 100 pieces of) batteries 1, which are arranged in the predetermined direction (narrow side direction of the battery 1) in the pallet, and between the adjacent batteries 1, a partition plate 21 is inserted to separate the batteries 1.

The partition plate 21 has a corresponding shape to the structure of the pallet 20 (or battery 1). In detail, the partition plate 21 is formed in the substantially same shape as the wide face of the casing 10 of the battery 1.

The pallet 20 and the partition plate 21 have structural strength and are made of fire retarding material, which have tolerance to cracking, solution, and ignite within a temperature range lower than the temperature where the thermorunaway of the battery 1 occurs (e.g. 150 to 200 degree Celcius). The fire retarding material may be ceramics, heat-resistant resin, mixture of heat-resistant resin and filler, or covered metal. In the embodiment, the sides and bottom of the pallet 20 and the partition plate 21 are made of the mixture of the heat-resistant resin and the glass filler, which are manufactured by conventional injection molding.

Figure 4:
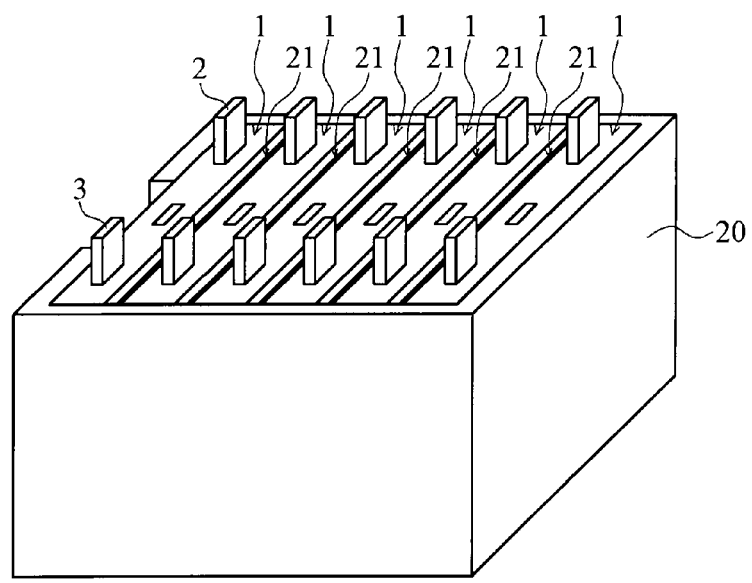
FIG. 4 depicts the batteries in a charging process.

As shown in FIG. 4, in the charging process of the batteries 1, the batteries 1 are stored in the pallet 20.

In the pallet 20, the batteries 1 and the partition plates 21 are arranged alternately with their wide faces touching each other. In the arrangement situation, the battery 1 is held by the partition plates 21, 21, or by the inside wall of the pallet 20 and the partition plate 21, and the batteries are charged under pressure in the arrangement direction. After the charging process, the batteries are also stored and transferred in the pallet 20.

In the charging process, the batteries 1 are stored in the pallet 20, transferred to the predetermined position, and the positive and negative terminals 2, 3 are connected to the external terminals (not shown), through which the electrical energy is supplied. The electrical energy is exchanged into the chemical energy in the battery 1, whereby the battery 1 is charged.

Figure 5:
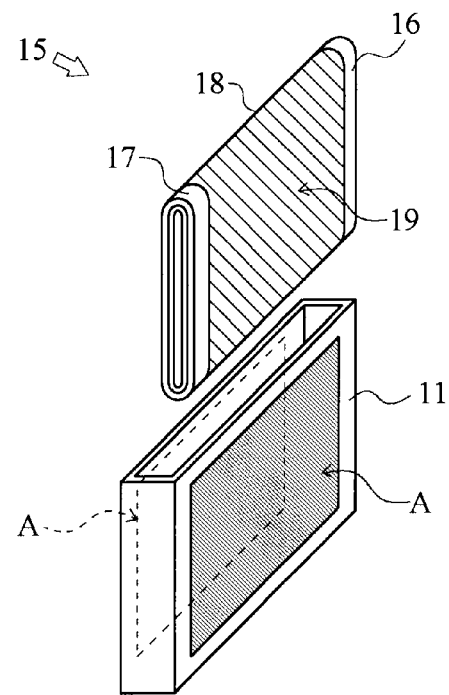
FIG. 5 depicts an area likely to become high temperature in the battery during the charging process.

As described above, in the charging process, the chemical reaction occurs in the batteries 1. Particularly, as shown in FIG. 5, the chemical reaction occurs at the overlapping section 19 (the hatched area in the figure) where the positive plate 16 and negative plate 17 of the electrode body 15 are overlapped via the separator 18. In the battery 1, the overlapping section 19 is sensitive to the temperature rising caused by the overcharge and is therefore the area likely to become high temperature.

The overlapping section 19 of the battery 1 is a core section of the battery 1, and the section is likely to become high temperature caused by the short circuit of the battery 1 or the external heat happened in the transfer process, aging process, storing process, and heat treatment process of a facility 30 for manufacturing the battery 1 as well as by the overcharge in the charging process.

As explained above, the overlapping section 19 in the electrode body 15 of the battery 1 is likely to become high temperature at the manufacturing processes after assembled. Thus, the area where temperature is likely to rise in the outside (the casing 10) of the battery 1 is the section near or touching the overlapping section 19 and where the heat transfer is easily caused via the electrode body 15, that is the area A (the hatched area in the figure) located at the outside of the casing 10 (the main body 11) to which the overlapping section 19 faces.

Figure 6:
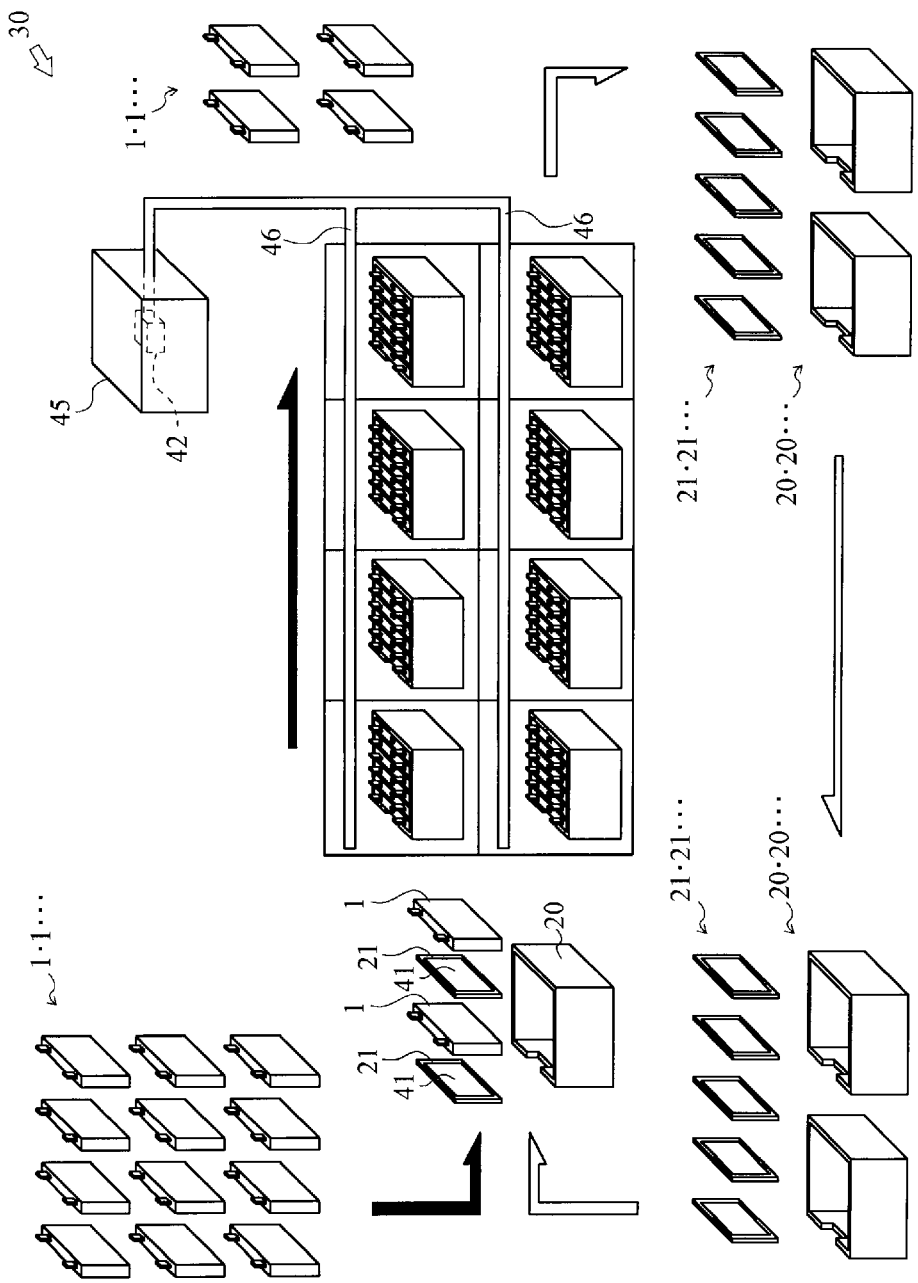
FIG. 6 illustrates a facility for manufacturing the batteries.
Figure 7:
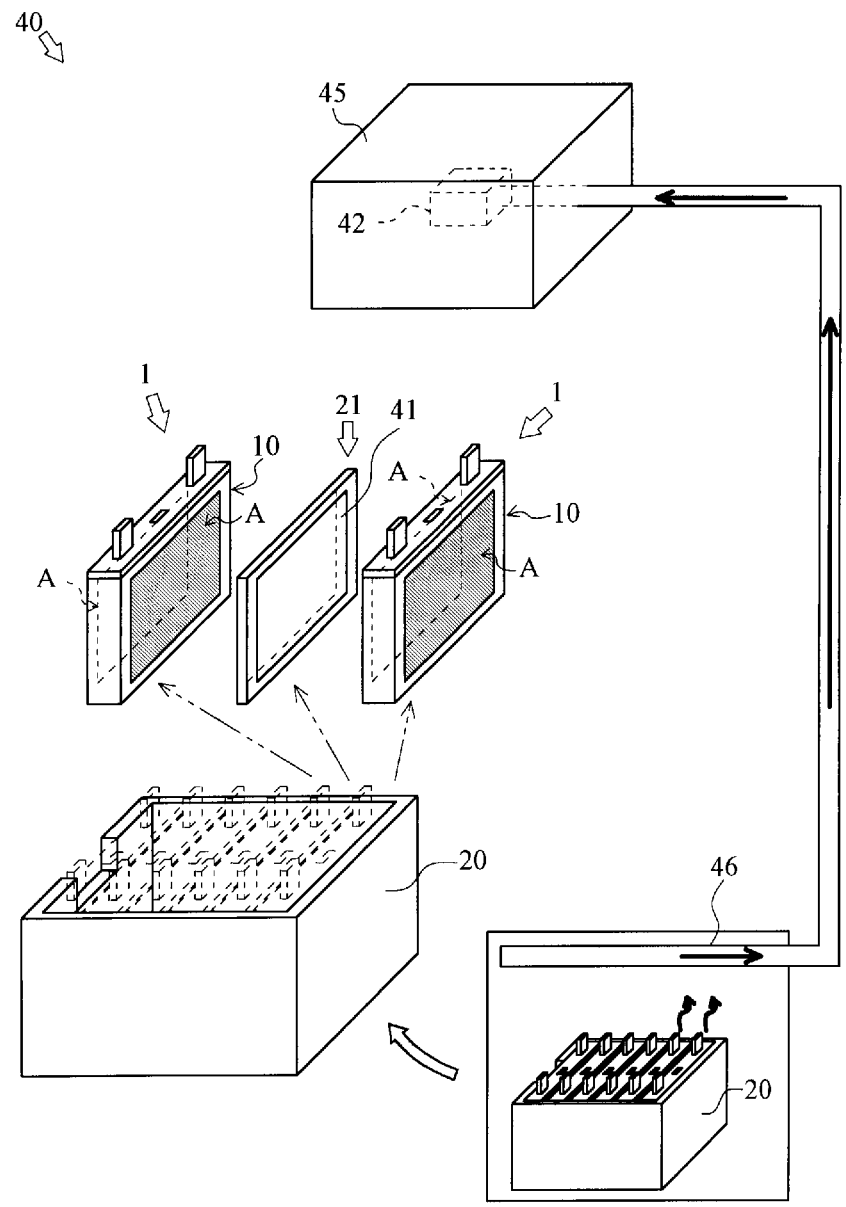
FIG. 7 depicts a detection device for detecting an abnormality of the batteries.
Figure 8:
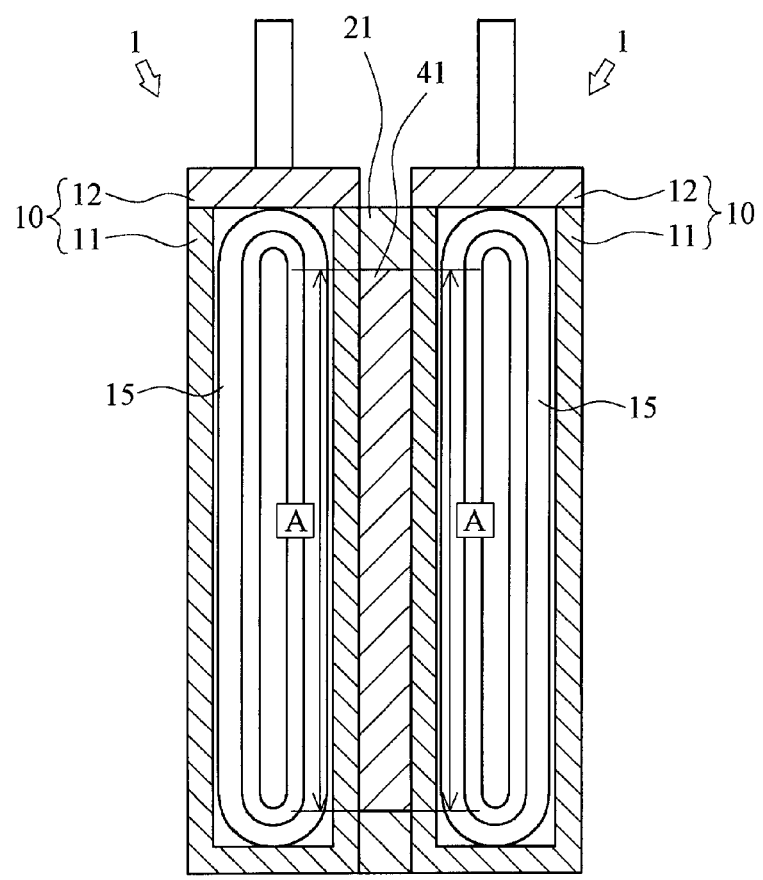
FIG. 8 is an enlarged sectional view showing the arrangement of the partition plate.

Referring to FIGS. 6 to 8, explained are the facility 30 and a device 40 for detecting an abnormality.

The facility 30 is for manufacturing the batteries 1. More specifically, the facility 30 has a closed room including an air conditioner for conditioning inside temperature, in which the batteries 1 are assembled, and the predetermined processes to ship the batteries 1 as products such as charging/discharging process, aging process, storing process, heat treatment process are performed to the assembled batteries 1.

As shown in FIG. 6, in the facility 30, multiple pallets 20 are transferred in order among the processes and during the processes, and the assembled batteries 1 are stored in the pallets 20 and transferred in order among the processes and during the processes. After the final process is finished, the batteries 1 as products are removed from the pallet 20, so that the pallet 20 and the partition plates 21 are used for storing new batteries 1 repeatedly.

The device 40 detects the abnormal condition of the battery 1, and especially detects the abnormal temperature rising to predict the thermorunaway of the battery 1. The device 40 is installed in the facility 30 for manufacturing the batteries 1.

As shown in FIG. 7, the device 40 includes a low temperature reaction material 41 and detection sensor 42. The material 41 is disposed in the partition plate 21, facing the overlapping section 19 that is likely to become high temperature in the battery 1 and contacting with the section via the casing 10, and the material changes in accordance with the abnormal condition (in the embodiment, in accordance with the process for the abnormally temperature rising) of the battery 1. The sensor 42 detects the change of the material 41. Thus, the device 40 detects the abnormality of the battery 1 by using the material 41 and the sensor 42.

As shown in FIGS. 7, 8, the material 41 is arranged in the center of the partition plate 21 and appears on the both surfaces of the wide faces of the plate 21. More specifically, the material 41 is arranged in the partition plate 21, which is inserted between the batteries 1 in the pallet 20, to face the area A of the casing 10 which is likely to become high temperature in the battery 1 and to touch the area A of the casing 10 when the plate 21 is stored in the pallet.

The material 41 is low temperature decomposable material, which reacts and is decomposed at least in the low temperature range with respect to the temperature range where the battery 1 is unsafe (e.g. thermorunaway threshold temperature: 150 to 200 degree Celcius). Such material as the low temperature decomposable material may be a plastic material such as polyvinyl chloride, acrylonitrile-butadiene-styrene resin, a rubber such as nitrile rubber, natural rubber, or a resin containing a plasticizer such as phthalate esters, polyester.

In the embodiment, the material 41 is a polyvinyl chloride containing a plasticizer at a proper proportion, and the plasticizer in the material 41 is decomposed (vaporized) to generate particle of smell or smoke at the temperature range from 60 to 100 degree Celcius. The particle of smell or smoke is exhaled in the vertical direction and passes through between the batteries 1 and the partition plates 21 to reach the space of the facility 30.

The sensor 42 detects the particles of smell and smoke, and is installed in a detection device 45 as shown in FIGS. 6, 7. The sensor 42 is configured as a smell sensor, smoke sensor, or a combination of these sensors, and detects the smell or/and smoke generated from the plasticizer contained in the material 41, whereby counting the amount of particles to determine the concentration per unit volume.

In the embodiment, the sensor 42 is the combination of the smell sensor and the smoke sensor, which detects the particles of smell and smoke generated from the plasticizer as the decomposable component of the material 41 and which determines the concentrations of the particles.

The detection device 45 gives an alarm such as a siren or stops the processes such as the charging process in accordance with the detected results of the sensor 42, that is the abnormality alarm for generating the control signal for taking the proper action on the facility 30.

As shown in FIGS. 6, 7, the sensor 42 of the device 45 is connected to multiple ducts 46 which communicate with the space of the facility 30 where the pallets 20 storing the batteries 1 are transferred.

The ducts 46 are located at the predetermined position in the processes such as the charging process, aging process or storing process of the facility 30, and have multiple micropores. The inside of each duct 46 is kept in negative pressure by means of a suction fan (not shown) of the device 45. Due to the negative pressure, the decomposed particles of smell and smoke caused by the material 41 are sucked into the device 45 through the micropores of the ducts 46.

Note that the micropores of the duct 46 are preferably formed to face the open face (top) of the pallets 20. The structure gives an easy suction of the decomposable components generated from the material 41 disposed in the plate 21 into the duct 46, thereby improving the detection sensitivity of the sensor 42.

Further, it is advantageous that the switching devices such as valves or cocks are installed between each duct 46 and the device 45. Due to the switching devices, it is found which duct 46 the decomposable component of the material 41 detected by the sensor 42 of the device 45 passes through, so that it is specified which process of the facility 30 in which the abnormality of the battery 1 occurs.

As described above, the low temperature reaction material 41 of the abnormality detection device 45 is disposed in the partition plates 21 of the pallet 20 storing the secondary batteries 1. The material 41 touches the section of the battery 1 that is likely to become high temperature (in detail, the part of the casing 10 where the abnormal temperature rising of the battery 1 appears).

Thus, the material 41 contacts with the sections, likely to become high temperature, of all of the batteries 1 stored in the pallet 20. As a result, if the facility 30 is large-scale, not only the wide range detection for the abnormal temperature rising of the batteries 1 but also the monitoring for the true value of the temperature of the batteries 1 (whether the temperature of the battery 1 becomes above the predetermined value) is provided.

Moreover, there is no need to individually provide the multiple batteries 1 with the temperature detection means such as temperature sensors, and to arrange the multiple batteries 1 to the predetermined position where the temperature detection means such as temperature sensors are mounted. As a result, the materials 41 as the temperature detection means are easily set to the batteries 1, thereby providing easy the attaching operation, the monitoring operation, and the cost of equipment.

When the battery 1 rises in temperature and above than the reaction temperature of the low temperature reaction material 41, the decomposable components such as smell or smoke are generated from the part of the material 41 where is in contact with the temperature rising portion. The detection sensor 42 detects the decomposable components, the detection device 45 stops the facility 30 (especially the charging operation in the charging process) or alerts the alarm according to the detected results.

In the facility 30, the abnormality detection device 40 detects the abnormal temperature rising of the battery 1 and takes the proper action in accordance with the detected result, so that the defect of the battery 1, for example thermorunaway, is prevented. Particularly, in the charging process of the battery 1, the output of the electrical energy for charging is stopped, so that the chemical reaction in the battery 1 is stopped and the further rising in temperature is prevented, and therefore the thermorunaway caused by the abnormal temperature rising of the battery 1 is prevented.

The pallets 20 and the partition plates 21 are made of the fire retarding material and the low temperature reaction material 41 is disposed in the partition plate 21 inserted between the batteries 1 stored in the pallet 20. Thus, they are repeatedly usable in the case that the abnormal temperature rising does not occur on the batteries 1. As a result, the present embodiment has an advantage on the cost in contrast to the conventional technique in which the materials 41 are arranged with the batteries 1 one by one or in which the material is installed in the battery 1.

In the processes of the facility 30, the assembled batteries 1 are stored in the pallet 20. Thus, not only in the charging/discharging process but also in the other processes after assembled, the abnormal temperature rising is detected, that is caused by the defect such as the short circuit of the batteries 1 or the heat energy added from the outside.

As to the facility for manufacturing the popular batteries without taking a special thermorunaway measure, preparing the pallets 20 and the partition plates 21 each of which includes the material 41 to store and transfer the batteries brings the same effects, so that the present embodiment is flexible.

In the embodiment, the partition plates 21 are separated form the pallet 20, however, the plates 21 may be fixed to the pallet 20.

Figure 9:
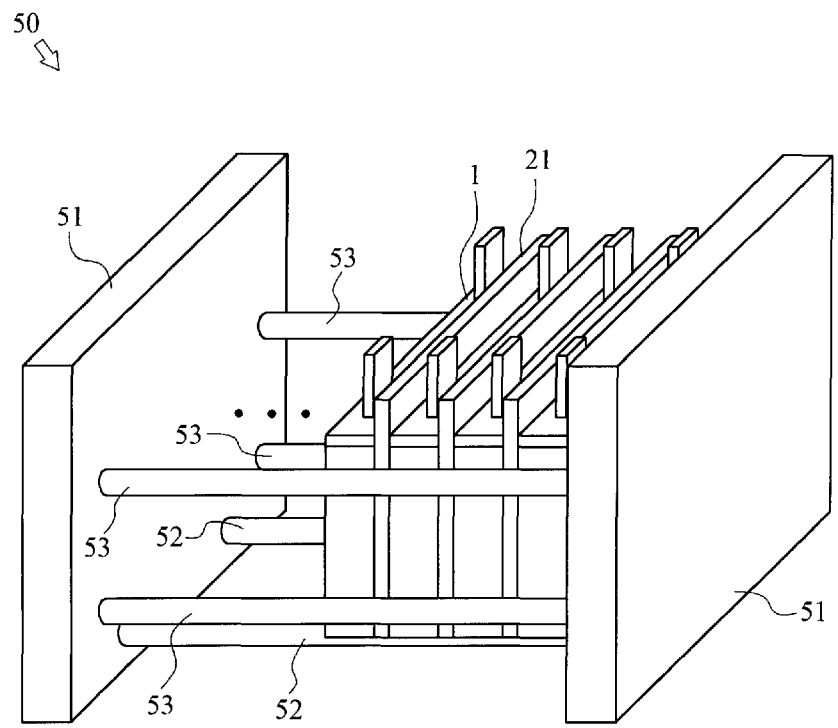
FIG. 9 is a perspective view of a storing jig as a second embodiment of a storing member according to the present invention.

In the embodiment, the batteries 1 are stored in the pallet 20, however, the storing member for the batteries may be a storing jig 50 shown in FIG. 9 and the like.

As shown in FIG. 9, the jig 50 stores multiple (e.g. 5 to 100 pieces of) batteries 1, and the partition plates 21 can be inserted between the adjacent batteries 1, 1 in the jig. The jig 50 has two side walls 51 arranged at the end thereof, two bottom shafts 52 penetrating the side walls 51 and supporting the bottom of the batteries 1 and plates 21 and four side shafts 53 penetrating the side walls 51 and supporting the side of the batteries 1 and plates 21. These shafts 52, 53 have the screw portions at both ends, to which the bolts can be screwed. In the jig 50, the distance between the two walls 51 is adjustable by changing the screw amounts of the bolts.

In the other embodiment, the container installed in the existing facility is adopted to store the batteries 1, and in this case, the partition plates 21 including the materials 41 are formed in the shape corresponding to the container. In this manner, the present invention can be easily applicable to the existing facility.

Figure 10:
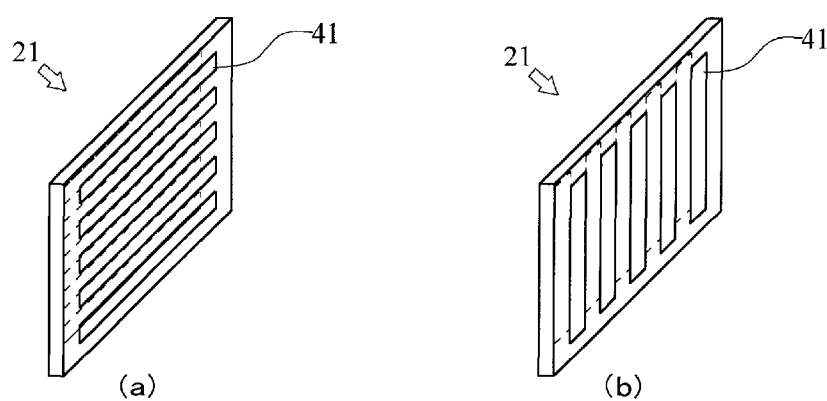
FIG. 10 depicts other embodiment of a low temperature reaction material in which it is arranged in stripe shape.
Figure 11:
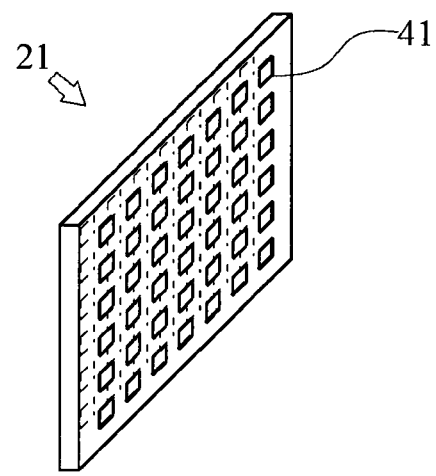
FIG. 11 depicts other embodiment of a low temperature reaction material in which it is arranged in dot shape.
Figure 12:
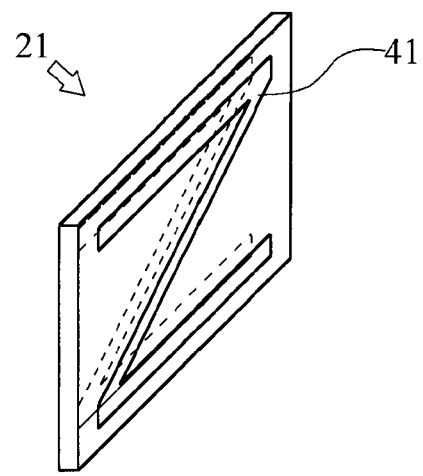
FIG. 12 depicts other embodiment of a low temperature reaction material in which it is arranged in Z-shape.

In the embodiment, the material 41 is arranged in the partition plate 21 to touch the whole area likely to become high temperature of the battery 1, but the arrangement of the material 41 is not limited, and the material may be arranged to partially touch the area being likely to become high temperature, considering the strength and durability of the plate 21 and the balance with respect to the detection area, for example, it may be arranged in the stripe shape shown in FIGS. 10(a), (b), in the dotted shape shown in FIG. 11, or in the Z-shape shown in FIG. 12. These arrangements are provided by the conventional two-stage injection molding or the like.

The installation method of the material 41 to the plate 21 is not limited to the injection molding, and the material 41 may be coated on, adhered on, welded to, or fitted into the both wide surfaces of the plate 21.

Furthermore, the material 41 includes the low temperature decomposable material which is decomposed by the temperature rising of the battery 1, so that considering the heat characteristics, the material preferably arranged at the upper portion of the plate 21. In other words, in consideration of flow characteristic of the heat convection that flows toward the opposite direction to the gravity direction, the material is arranged at the upper portion of the plate 21 to touch the upper portion of the casing 10 where is likely to become high temperature in the battery 1.

Figure 13:
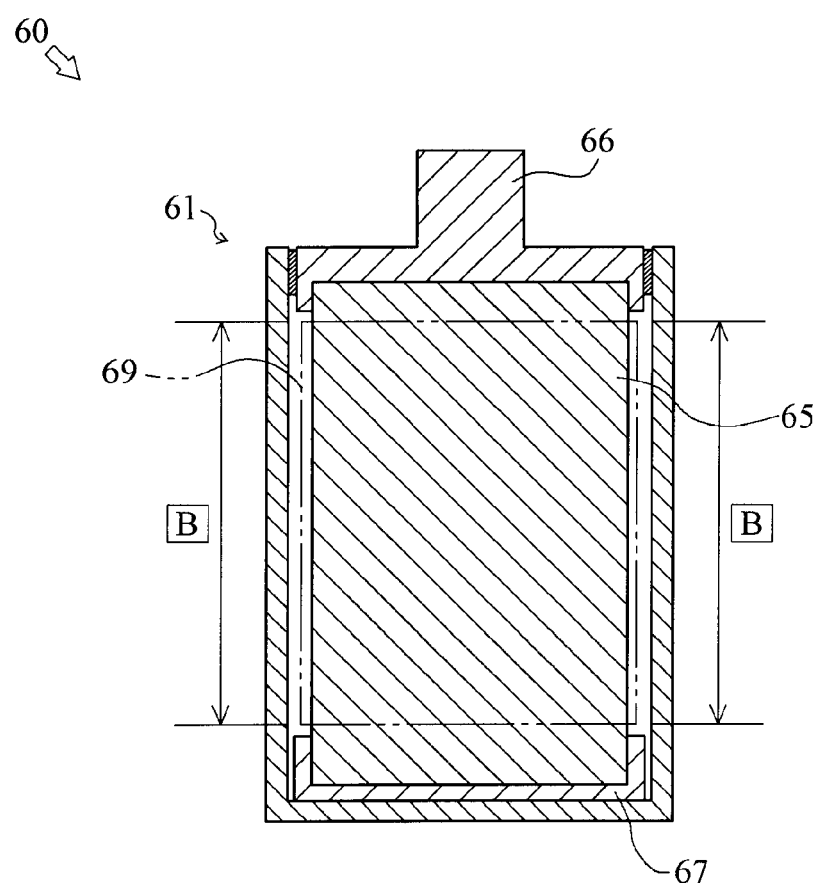
FIG. 13 is a sectional view showing a cylindrical battery as a second embodiment of the battery.
Figure 14:
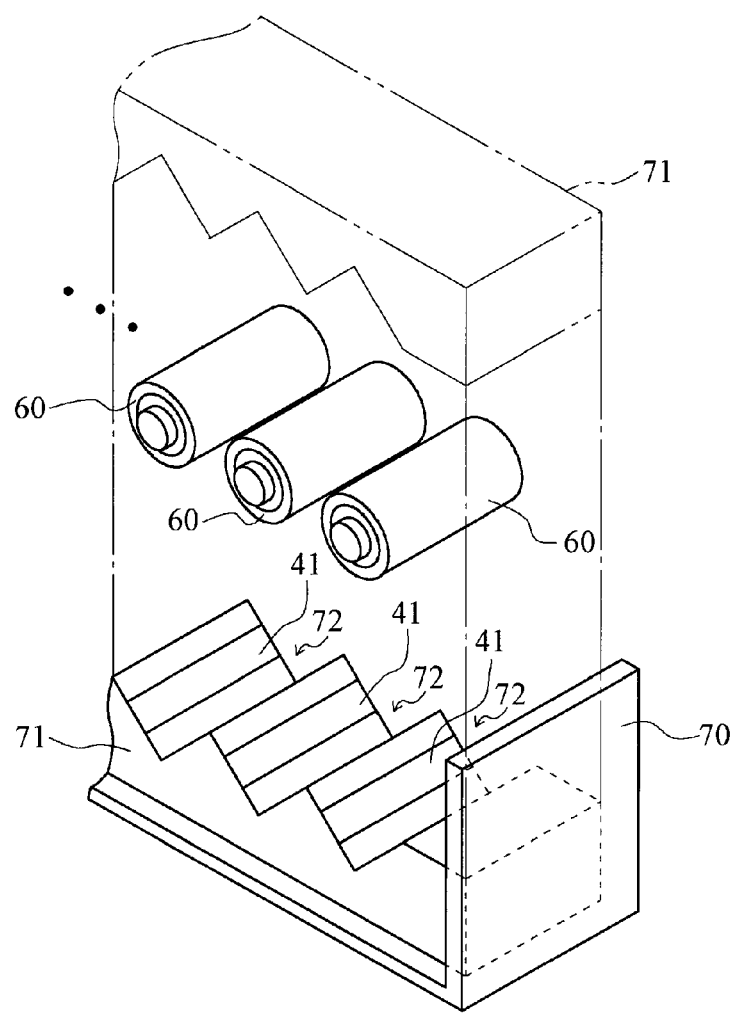
FIG. 14 illustrates a storing member for storing the cylindrical batteries and an arrangement of the low temperature reaction material in a partition member.
Figure 15:
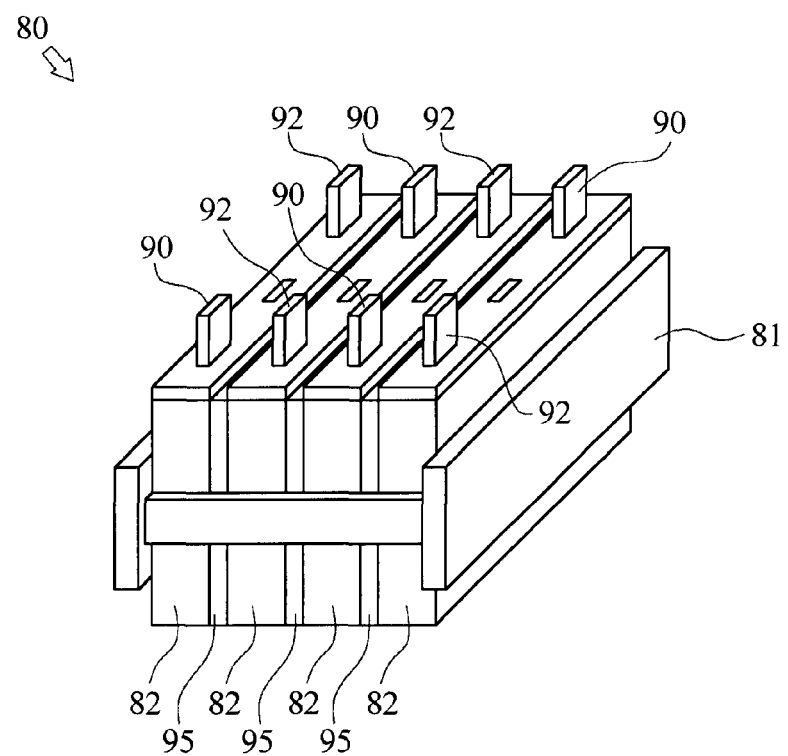
FIG. 15 is a perspective view showing an assembled battery as a third embodiment of the battery.
Figure 16:
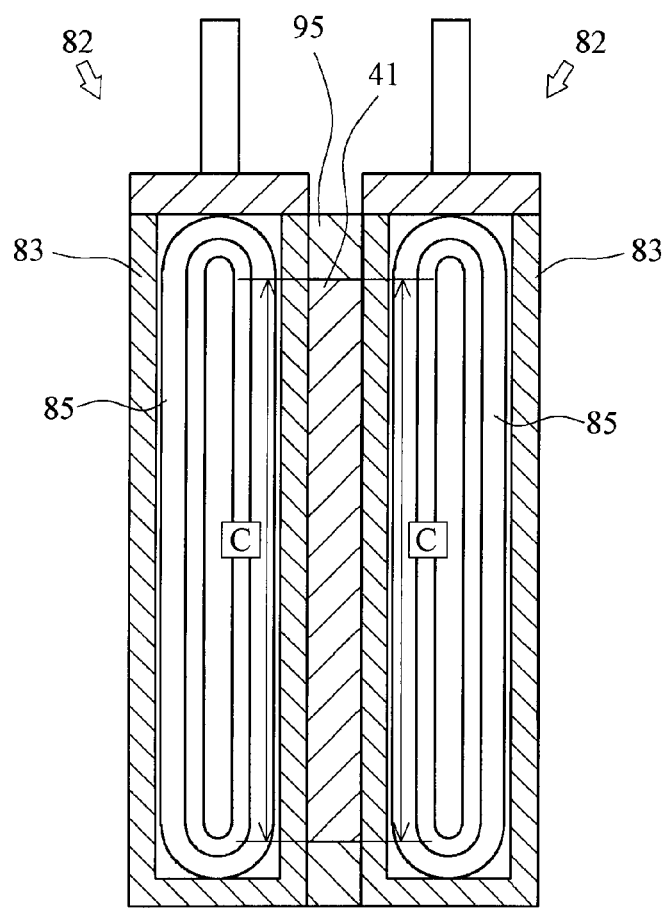
FIG. 16 is an enlarged sectional view showing an arrangement of the partition plate between the battery cells composing the assembled battery.

In the embodiment, the abnormal detection device 40 detects the abnormal condition of the prismatic battery 1, and the other embodiment of the battery may be a cylindrical battery 60 depicted in FIGS. 13, 14 or an assembled battery 80 depicted in FIGS. 15, 16.

As shown in FIG. 13, the battery 60 is a lithium ion secondary battery including a cylindrical casing 61 and an electrode body 65 contained in the casing and configured as a roll electrode body, in which the positive plate and the negative plate are layered via a separator and they are wound cylindrically. The battery 60 includes the electrode body 65, a positive terminal 66 and a negative terminal 67, and the both ends of the electrode body 65 are respectively connected to the positive and negative terminals 66, 67.

The positive terminal 66 is electrically connected to the positive plate of the electrode body 65 and projected from the casing 61 with isolated from the casing, and the negative terminal 67 is electrically connected to the negative plate of the electrode body 65 and fixed to the inside of the casing 61 at the opposite end of the positive terminal 66.

In the embodiment, as same as the prismatic battery 1, the area likely to become high temperature of the battery 60 is an overlapping section 69 where the positive plate and the negative plate are overlapped. The area likely to become high temperature of the outside of the battery 60 is the area B (shown in figure) facing the overlapped section 69 of the casing 61 and located near or touching the overlapping section 69.

As shown in FIG. 14, in a pallet 70 storing the batteries 60, two partition members 71 are used for separating the batteries 60. The partition member 71 has triangle grooves 72 shaped corresponding to the batteries 60, and the triangle grooves 72 of the partition members hold the batteries 60. The batteries 60 are held in the partition members 71 in the pallet 70 and transferred among the processes and during the processes.

In this case, the low temperature reaction material 41 is arranged in the part of the groove 72 of the partition member 71 where the battery 60 contacts. In other words, the material 41 is arranged to touch the part of the area likely to become high temperature in the battery 60.

As to the battery 60, when the abnormal temperature rising occurs in the battery 60, the material 41, disposed touching the part of the area likely to become abnormally high temperature in the battery 60, rises in temperature and generates the decomposable components, so that detecting the decomposable components in the above-described ways provides the detection of the abnormal temperature rising.

As depicted in FIGS. 15, 16, the assembled battery 80 has a casing 81 in which multiple battery cells 82 are arranged in the predetermined direction. The casing 81 has a shape corresponding to the battery cells 82 to hold them, and the cells 82 are pressed in the arrangement direction. The cell 82 is a lithium ion secondary battery having a rectangular parallelepiped casing 83 and an electrode body 85 contained in the casing, configured as a roll electrode body, in which the positive and negative plates are layered via a separator and they are wound flatly, that is as same as the battery 1 in the first embodiment. Note that the battery cell 82 of the assembled battery 80 may be a laminate battery in which the electrode body 85 is covered with the laminate film.

As to the battery cell 82, as same as the prismatic battery 1, the area likely to become high temperature of the battery is an overlapping section (not shown) where the positive plate and the negative plate are overlapped. The area likely to become high temperature of the outside of the cell 82 is the area C (shown in figure) facing the overlapped section of the casing 83 of the cell 82 and located near or touching the overlapping section.

From the casing 83 of the cell 82, a positive terminal 90 connected to the positive plate and a negative terminal 92 connected to the negative plate are projected. The cells 82 are arranged such that the positive terminals 90 are alternated with the negative terminals 92 so that the cells 82 are connected in series. Between the cells 82 arranged in such a manner, a radiator plate 95 is inserted. The radiator plate 95 separates the adjacent cells 82 and secures the heat radiating performances of the cells 82.

In the assembled battery 80, the casing 81 holds the cell 82 and the plate 95 in order, and the assembled battery is transferred among the processes and during the processes.

As depicted in FIG. 16, the low temperature reaction material 41 is housed in the casing 81 and is disposed in the radiator plate 95 inserted between the battery cells 82. The material is arranged to touch the area C of the outside of the cell 82 where is likely to become high temperature.

As described above, regarding the assembled battery 80, the abnormality detection device 40 detects the abnormal temperature rising.

The abnormality detection device 40 including the material 41 and the detection sensor 42 is installed in the assembled battery, whereby the abnormal temperature rising of the secondary battery is detectable even when the battery is in use.

INDUSTRIAL APPLICABILITY

The present invention is applicable to the facility for manufacturing batteries, especially to the technique of detecting the abnormal temperature rising of the facility for manufacturing the secondary battery (e.g. lithium ion secondary battery) and of preventing the defect caused by the abnormal temperature rising.

The invention claimed is:

1. A device for detecting an abnormality of multiple batteries stored in a storing member made of fire retarding material, comprising:
    a low temperature reaction material reacting at lower temperature than the temperature that the abnormality of the batteries occurs, arranged to contact an area of each of the batteries likely to become high temperature; and
    a sensor for detecting the change of the material,
    wherein the area of each of the batteries likely to become high temperature is an overlapping section at which a positive electrode of each of the batteries and a negative electrode of each of the batteries are overlapped via a separator, and the low temperature reaction material is arranged facing the overlapping section,
    wherein in the storing member, partition members made of fire retarding material are inserted between each of the adjacent batteries, and the partition members and the batteries are arranged alternately with their wide faces touching,
    wherein the low temperature reaction material is arranged in the partition member, and
    wherein the sensor is configured as a smell sensor, a smoke sensor, or a combination of these sensors.

* * * * *